3,083,174
TREATMENT OF A PETROLEUM RESIN WITH A PHENOLIC RESOL COMPOUND
Morton Fefer, Metuchen, and James V. Fusco and John B. Riley, Westfield, N.J., assignors to Esso Research and Engineering Company, a corporation of Delaware
No Drawing. Filed Oct. 31, 1958, Ser. No. 770,943
8 Claims. (Cl. 260—43)

This invention relates to a method for improving the softening properties of hydrocarbon resins prepared by polymerizing unsaturated hydrocarbon-containing streams with a Friedel-Crafts type catalyst. More particularly this invention relates to a method for improving the softening point of such a resin without any substantial color degradation by a postpolymerization of the resin in the presence of certain alkylated phenols.

TABLE I

Steam Cracked Naphtha Fraction Boiling Between 15° to 130° C.

| Component | Approximate Boiling Range, °C. | Specific Example, Wt. Percent | General Range, Wt. Percent |
|---|---|---|---|
| $C_5$ Fraction | 15 to 50 | 19 | 10 to 30 |
| $C_6$ Fraction | 50 to 70 | 22 | 10 to 40 |
| $C_7$ Fraction | 70 to 100 | 44 | 30 to 55 |
| $C_8+$ Fraction | 100 to 130 | 15 | 8 to 25 |

The fractions recited in Table I above comprise a mixture of various diolefins, olefins, paraffins and aromatics.
Table II shows the various components of the fractions listed above.

TABLE II

[Wt. percent]

| Fraction | Olefins | | Diolefins | | Paraffins | | Aromatics | | Other Hydrocarbons | |
|---|---|---|---|---|---|---|---|---|---|---|
|  | Specific | General | Specific | General | Specific | General | Specific | General | Specific | General |
| $C_5$ Fraction [1] | 60 | 40 to 80 | 18 | 10 to 30 | 23 | 10 to 35 | 0 | 0 to 5 | 0 | 0 to 2 |
| $C_6$ Fraction [1] | 75 | 45 to 85 | 9 | 2 to 20 | 8 | 2 to 20 | 0 | 0 to 10 | 8 | 0 to 10 |
| $C_7$ Fraction [1] | 15 | 5 to 25 | 20 | 5 to 30 | 10 | 5 to 20 | 55 (benzene) | 30 to 70 |  | 0 to 10 |
| $C_8+$Fraction [1] | 0 | 0 to 2 | 0 | 0 to 2 | 0 | 0 to 2 | 60 (toluene) | 30 to 90 | 40 | 20 to 60 |

[1] Each fraction totals 100%.

Hydrocarbon resins can be produced from certain unsaturated petroleum refinery streams which contain various mixtures of acyclic and cyclic olefins and diolefins by contact with a Friedel-Crafts type catalyst under relatively low temperatures, e.g., −30° to +90° C. The hydrocarbon mixtures obtained by steam cracking petroleum oils have been found to be especially useful for this purpose. These distillates are prepared by cracking petroleum fractions such as kerosene, gas oil, naptha or residua in the presence of large amounts of steam, e.g., 50 to 90 mole percent, at temperature of approximately 1,000° to 1,600° F. This steam cracking process is well known in the patented art and literature. The cracked liquid fraction boiling largely below $C_9$ ordinarily contains small amounts of cylopentadiene monomers, e.g., 3 to 5%, which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam-cracked hydrocarbon streams such as described above and more particularly below may be employed. For example, a resin may be prepared from feed stocks having a relatively wide boiling range, e.g., 15° to 130°. Typical analyses of such a wide steam cracked boiling fraction are shown in the following table:

As noted from the above table, the wide cut steam cracked fraction comprises substantial amounts of olefinic compounds with small amounts of diolefins. This wide cut may be used as such or, if desired, a narrow fraction, e.g., a $C_5$ containing stream boiling in the range of 15° to 50° C. of the composition shown in Table II for the $C_5$ fraction.

It is desirable for many uses, e.g., in floor tiles, to obtain resins having relatively high softening points. To accomplish this, prior art has suggested the inclusion of various components with the hydrocarbon feed. Also it has been suggested to polymerize a second component in the presence of the finished resin. It has been indicated, for example, that divinyl benzene and cyclopentadiene be added to the resin feed for the purpose of increasing the softening point. These additives, while satisfactory for the purposes intended, create problems and have some adverse effects on the resin. With divinyl benzene additive the stability, i.e., shelf life, is decreased somewhat, and with cyclopentadiene there is, accompanying the increase in softening point, a degradation in color and odor.

It has now been found that if a quantity of the alkylated phenol compounds to be described subsequently is added to the petroleum resin, and subjected to polymerization conditions, the resultant resin will have a markedly improved softening point. Raising the softening point by this technique is not offset by a reduction in product quality as is accompanied by other additives employed for similar purposes. The resin prepared by post-polymerization in the presence of the present additives is as thermally stable as those which are not subjected to the post-polymerization treatment.

The initial polymerization of steam-cracked petroleum hydrocarbons may be carried out in any conventional batch, semi-continuous or continuous fashion, all of which are well known in the petroleum resin art. The desired unsaturated hydrocarbon mixture is preferably contacted with small amounts of Friedel-Crafts catalyst such as boron trifluoride, aluminum chloride, aluminum bromide or the like. Amounts of from 0.25 to 3.0% based on the unsaturated content of the feed are preferred. The catalyst may be employed in its solid state or in solutions, slurries or complexes. For example, boron trifluoride may be complexed with ether to form an etherate in accordance with techniques known in the art and the etherate may be employed as the catalyst.

The polymerization reaction is conducted with temperatures in the range of −30° to +90° C. and preferably from +5° to +75° C. In carrying out a continuous or batch operation, there is preferably employed an inert diluent such as benzene, naphtha, paraffins, cycloparaffins or other hydrocarbon fractions preferably boiling in the range of 70° to 125° C. The diluent may be employed in amounts from 5–75% by weight based on the olefin-containing feed. The diluent may be added first, last or at the same time as the feed. The reactor should comprise means for agitating the reaction mixture and the feed is preferably agitated during the addition of the catalyst and during the entire reaction time. Preferably the catalyst is added slowly over a period of 5 minutes to one hour or until the desired catalyst concentration has been reached. The temperature of the reaction mixture may be controlled by any known technique, a particularly preferred one is referred to normally as a pump-around system where the reaction mixture is continuously circulated through a temperature-controlling bath adapted to either heat or cool the mixture. After the start up on the reaction, the catalyst is continuously added at a rate to give the desired catalyst concentration together with fresh steam-cracked hydrocarbon feed. In a continuous system, a portion of the reaction mixture is continuously drawn off to a second vessel if desired to provide additional contact time and the product is withdrawn from the second vessel either batchwise or continuously. One technique for carrying out a batch reaction comprises forming a slurry of the catalyst in diluent and then slowly adding the steam cracked feed. The mixture is continuously agitated. If desired, only a portion of the aluminum chloride is added initially and the remainder after the reaction is started. The product mixture is then quenched, washed and stripped to give the final resin product. The reaction mixture may be quenched with an acid such as dilute sulfuric or phosphoric acid to stop the reaction. Water soluble non-ionic wetting agents such as alkyl polyethers, etc. may also be employed. These are all well known in the art. Subsequent to the quench, the product is usually water and/or alkali washed to remove any residual acidity. Subsequent to the washing, the resin solution is then stripped of diluent, unreacted hydrocarbon and any low molecular weight polymer to give the hard resin product. The stripping may be carried out in accordance with well-known techniques by vacuum or steam distillation. For example, hard resins are conveniently recovered by stripping to a bottoms temperature to about 270° C. at 2–5 mm. Hg or the solution may be steam stripped for about 2 hours at 260° C. While the softening point may be raised by increasing the severity and/or time of stripping, this only results in relatively small increases in softening point and is accompanied by a loss in resin yield with a corresponding increase in undesired liquid polymer.

A single reactor may be employed in lieu of the two reactors described above; however, in this case the single reactor will preferably comprise several stages.

The additive employed in this invention is an alkylated phenol contaning either methylol or methyl halide substituents on the aromatic nucleus. The additive may be employed in its monomeric or polymeric form. The following formula represents generically the type of compound which when employed in a post-polymerization of a petroleum resin will effect an increase in softening point.

(1) 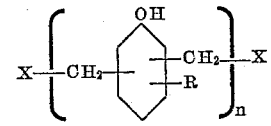

wherein X represents a hydroxyl radical or a halide such as chloride, bromide, iodide and fluoride; R may represent any alkyl radical, either branched or straight chain, having from 1 to 12 carbon atoms, preferably branched chain radicals such as tertiary butyl, isohexyl or isooctyl will be employed; and $n$ represents an integer from 1 to 20 or higher.

The following formulae represent specific compounds coming within the scope of this generic formula:

(2) 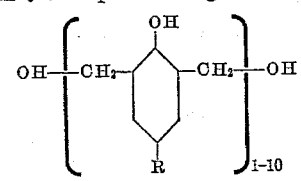

(3) 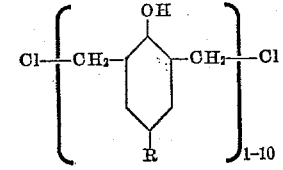

Typical alkyl groups include methyl, ethyl, propyl, n-butyl, tertiary butyl, pentyl, etc. up to 10 carbon atoms.

The phenol additive is most conveniently employed in solution with an inert hydrocarbon solvent such as benzene, toluene, xylene, cyclohexane, etc. When employed in a solution, the solvent may be present in a ratio of from 1–20 volumes of solvent per volume of phenol additive, although this ratio is not critical.

By the term "post-polymerization" it is meant to include polymerizing the phenolic additive in the presence of the finished resin after it has been worked up. This term also includes adding the phenolic compound during the polymerization of the steam cracked hydrocarbon feed but after some resin has formed. The addition of the phenolic compound of this invention will increase the softening point of the resultant resin as long as it is added after the initial Friedel-Crafts polymerization reaction has started and some resin has formed. Accordingly, the steam cracked fraction may be polymerized to form a resin, the resin worked up and subsequently post-polymerized with the phenolic compound or the crude resin product mixture from the polymerization reaction may be post-polymerized wtih the phenolic compound, or the phenolic compound may be added after the Friedel-Crafts polymerization reaction has started. The phenol additive and the resin in the presence of suitable amounts of diluent may be simply heated at reflux for several hours, e.g., 100–200° C. These temperatures are not critical and depend on whether there is a polymerization catalyst present. Preferably, atmospheric conditions are employed, although there may be utilized vacuum or pressure equipment depending on the stability of the particular resin at the reflux temperatures. The time of reaction for the post-polymerization is not critical as long as the proper interaction between the phenolic compound and the resin takes place. For example, the postpolymerization may be carried out over a period of 10 minutes up to 5 hours or longer. The phenolic additive is preferably employed in an amount from 1 to 35 weight percent phenol based on total resin (excluding diluent).

For a more complete understanding of the invention reference is now had to the following examples:

EXAMPLE 1

Nine grams of a petroleum resin prepared by polymerizing a $C_5$ fraction from a steam cracked naphtha of the approximate composition as described in Table II was dissolved in 50 ml. of xylene diluent. To the solution was added 20 ml. of a stock solution prepared by dissolving one gram of 2,6-dimethylol-4-tertiary butyl phenol per 10 ml. of xylene solvent. The mixture was then refluxed at 140° C. for 2 hours. The reaction mixture was then filtered to obtain the resin which was stripped to a final pot temperature of 220° C. at 3 mm. Hg. The softening point of the original resin was 96° C. and the final softening point after post-polymerization with the noted phenolic compound was 120° C., an increase of 24° C.

EXAMPLE 2

The same procedure as Example 1 was carried out employing 10 ml. of the stock reagent which contained one gram of the phenolic compound and the softening point was raised from 96° C. to 110° C., an increase of 14° C.

EXAMPLE 3

The same procedure as Example 2 was carried out employing 5 ml. of the stock reagent which contained .5 gram of the phenolic compound and the softening point was raised from 96° C. to 106° C., an increase of 10° C.

EXAMPLE 4

Nine grams of a petroleum resin derived from a steam cracked olefinic fraction and having a softening point of 70° C. was treated with 10 ml. of the above stock solution containing one gram of phenolic compound under the conditions of Example 1. The softening point was raised to 91° C., an increase of 21° C.

EXAMPLE 5

The same resin as employed in Example 4 was treated with 20 ml. of the stock solution containing 2 grams of the phenolic compound in the presence of a diluent as recited in Example 1 to raise the softening point from 70° C. to 91° C., an increase of 21° C.

To demonstrate the effectiveness of the polymers derived from the above dimethylol phenolic compound, reference is now had to the following examples:

EXAMPLE 6

Nine grams of a petroleum resin substantially the same as that employed in Examples 4 and 5 and having an original softening point of 70° C. were mixed with one gram of polyhydroxymethyl phenol polymer having the following formula:

(4)

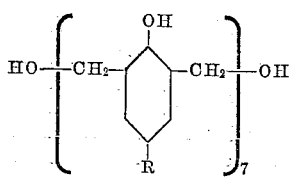

where R=isooctyl, were dissolved in 50 ml. of xylene. The contents were placed in a 200 ml. round bottom flask and heated at reflux for 2 hours. The reaction mixture was filtered and stripped to a final pot temperature of 250° C. at 3 mm. Hg. The initial softening point was 79° C. and the final softening point of the treated resin was 89° C., an increase of 10° C.

EXAMPLE 7

The experiment of Example 6 was repeated exactly employing a petroleum resin having an initial softening point of 96° C. The final softening point after treatment was 112° C., an increase of 16° C.

EXAMPLE 8

$AC_5$ steam cracked feed which normally yields a resin having a softening point of 70° C. was polymerized in the presence of 1 weight percent aluminum chloride at 30–35° C. During the reaction, after some resin had formed (approximately 1½ hours after the start of the reaction), there was added 10 weight percent of the polyhydroxymethyl phenol polymer as recited in Example 7 dissolved in benzene. The reaction was allowed to proceed another ½ hour and the reaction product refluxed for ½ hour. The crude resin product was then washed with 200 ml. of 10% aqueous sodium carbonate solution and stripped to a final pot temperature of 270° C. at 3 mm. Hg. The final softening point of this resin was 92° C., an increase of 22° C. over what is obtained by the polymerization of the same feed in the absence of this additive.

The above Example 8 demonstrates that the post-polymerization may be carried out during the actual resin forming polymerization reaction and therefore in essentially one step. This of course has an economic advantage over the two-step processes of the previous examples in that it is not necessary to first obtain and purify the resin and then copolymerize it with the phenolic additive. Care must be taken, however, to avoid adding the phenolic compound to the reaction mixture prematurely since these compounds tend to deactivate the Friedel-Crafts catalyst. It is essential, therefore, when carrying out this invention as described in Example 8 that the initial Friedel-Crafts polymerization be permitted to undergo at least partial reaction before adding the phenolic compound.

To demonstrate the effect of the halogen containing phenol derivatives, reference is now had to the following examples:

EXAMPLE 9

Nine grams of a petroleum resin having a softening point of 70° C. and one gram of polybromomethyl phenol polymer having the following formula:

(5)

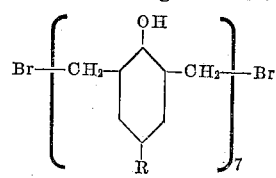

where R=isooctyl, were dissolved in 50 ml. of xylene. The contents were placed in a 200 ml. round bottom flask and heated at reflux for 2 hours. The reaction mixture was heated and stripped to a final pot temperature of 250° C. at 3 mm. Hg. The final softening point obtained was 88° C., an increase of 18°.

EXAMPLE 10

Example 9 was repeated exactly employing a petroleum resin having an original softening point of 96° C. The final softening point was 113° C., an increase of 17°.

EXAMPLE 11

Seven grams of a petroleum resin having an original softening point of 70° C. and .7 gram of polychloromethyl phenol polymer of the following structural formula:

(6)

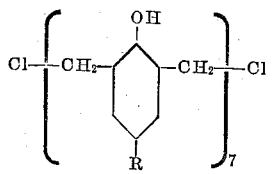

where R=isooctyl, were dissolved in 50 ml. of xylene and the contents placed in a 200 ml. round bottom flask and heated at reflux for 2 hours. The reaction mixture was filtered and stripped to a final pot temperature of 220° C. at 3 mm. Hg. The final softening point obtained was 88° C., an increase of 18°.

EXAMPLE 12

Nine grams of petroleum resin having an original softening point of 96° C. was treated as in Example 11 with one gram of the polychloromethyl phenol polymer. The product was worked up as in Example 11. The final softening point was 107° C., an increase of 11°.

EXAMPLE 13

A $C_5$ fraction from a steam cracked naphtha feed was polymerized in the presence of aluminum chloride catalysts in a conventional manner. After the reaction had proceeded from about 1½ hours, there was added 10 weight percent based on feed of the polychloromethyl phenol polymer, as in the previous two examples. The reaction was allowed to proceed another ½ hour after the addition of the poly phenol. Thirty ml. of a .16 aqueous solution of an alkyl polyethylene oxide (Ethofat) was then added to quench the reaction and the contents allowed to reflux ½ hour after which it was washed with a 10% aqueous sodium carbonate solution. The reaction mixture was then stripped to a final pot temperature of 270° C. at 3 mm. of Hg. Final softening point obtained was 83° C. as compared with a softening point of 70° C. which is normally obtained employing this $C_5$ steam cracked fraction.

What is claimed is:

1. In a process for preparing a petroleum resin wherein an unsaturated steam cracked petroleum fraction boiling within the range of 15° to 130° C. is contacted with a Friedel-Crafts catalyst at a temperature between −30° C. to +90° C. with agitation to produce a resinous product, the improvement which comprises contacting said resinous product with from 1 to 35 weight percent of the following compound:

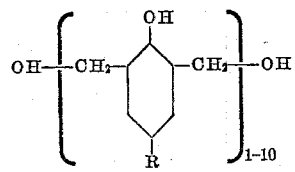

wherein R is an alkyl group, heating the resulting mixture to 100 to 200° C. for at least 10 minutes and recovering a resin having an increased softening point.

2. A process in accordance with claim 1 wherein said compound is a polymer of 2,6-dimethylol 4-tertiary butyl phenol.

3. In a process for preparing a petroleum resin wherein an unsaturated steam cracked petroleum fraction boiling within the range of 15° to 130° C. is contacted with a Friedel-Crafts catalyst at a temperature between −30° C. to +90° C. with agitation to produce a resinous product, the improvement which comprises contacting said resinous product with from 1 to 35 weight percent of the following compound:

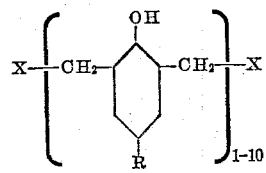

wherein X is a halogen and R is an alkyl group, heating the resulting mixture to 100 to 200° C. for at least 10 minutes and recovering a resin having an increased softening point.

4. A method in accordance with claim 3 wherein said compound is a monomer.

5. A method in accordance with claim 3 wherein said compound is a polymer.

6. A process for preparing a petroleum resin which comprises passing to a reaction zone a steam cracked petroleum fraction boiling within the range of 15° to 130° C. and containing olefins and diolefins, contacting said hydrocarbon fraction in said reaction zone with a Friedel-Crafts catalyst at a temperature from −30° to 90° C. until at least some resin has formed, adding to said reaction zone a compound of the following formula:

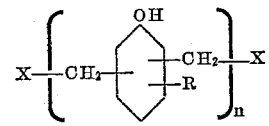

wherein X represents a radical selected from the group consisting of hydroxyl and halide, R represents an alkyl group and n is an integer from 1 to 20, said compound being added in an amount sufficient to raise the final softening point of the resin, continuing the polymerization in the presence of said compound and recovering a resin having an increased softening point.

7. A process for preparing a petroleum resin which comprises polymerizing a steam cracked petroleum fraction boiling within the range of 15° to 130° C. and containing olefins and diolefins in the presence of a Friedel-Crafts catalyst, recovering a resinous product, contacting said resinous product with a compound of the following formula:

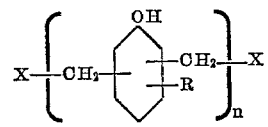

wherein R is an alkyl group, X represents a radical selected from the group consisting of hydroxyl and halide and n is an integer from 1 to 20, heating the resulting mixture to 100 to 200° C., maintaining said temperature for a time sufficient to increase the softening point of said resin.

8. In a process for preparing a petroleum resin wherein an unsaturated steam cracked petroleum fraction boiling within the range of 15° to 130° C. is contacted with a Friedel-Crafts catalyst at a temperature between −30° and +90° C. with agitation to produce a resinous product, the improvement which comprises contacting said resinous product with from 1 to 35 wt. percent of 2,6-dimethylol-4-tertiary butyl phenol, heating the resulting mixture to 100 to 200° C. for 10 minutes to 5 hours and recovering a resin having an increased softening point.

References Cited in the file of this patent

UNITED STATES PATENTS

| | | |
|---|---|---|
| 2,282,456 | Christmann et al. | May 12, 1942 |
| 2,468,413 | Soday | Apr. 26, 1949 |
| 2,728,742 | Banes et al. | Dec. 27, 1955 |
| 2,837,491 | McKay | June 3, 1958 |
| 2,898,325 | Fusco et al. | Aug. 4, 1959 |

FOREIGN PATENTS

| | | |
|---|---|---|
| 516,344 | Great Britain | Jan. 1, 1940 |